United States Patent
Gollnick et al.

(10) Patent No.: US 7,206,592 B1
(45) Date of Patent: Apr. 17, 2007

(54) SYSTEM FOR COUPLING A MULTIPLICITY OF RF DATA COLLECTION TERMINALS WITH HOST COMPUTER MEANS

(75) Inventors: Charles D. Gollnick, Sherwood, OR (US); Ronald E. Luse, Marion, IA (US); John G. Pavek, Cedar Rapids, IA (US); Marvin L. Sojka, Cedar Rapids, IA (US); James D. Cnossen, Marion, IA (US); Robert G. Geers, Cedar Rapids, IA (US); Arvin D. Danielson, Solon, IA (US); Mary L. Detweiler, Parnell, IA (US); Gary N. Spiess, Lisbon, IA (US); Guy J. West, Valenzuela (PH); Amos D. Young, Cedar Rapids, IA (US); Keith K. Cargin, Jr., Cedar Rapids, IA (US); Richard C. Arensdorf, Cedar Rapids, IA (US); Ronald L. Mahany, Cedar Rapids, IA (US)

(73) Assignee: Broadcom Coporation, Irvine, CA (US)

( * ) Notice: Subject to any disclaimer, the term of this patent is extended or adjusted under 35 U.S.C. 154(b) by 646 days.

(21) Appl. No.: 09/972,749

(22) Filed: Oct. 8, 2001

Related U.S. Application Data

(63) Continuation-in-part of application No. 10/057,816, filed on Jan. 24, 2002, which is a continuation-in-part of application No. 09/934,457, filed on Aug. 21, 2001, now abandoned, which is a continuation of application No. 08/551,442, filed on Nov. 1, 1995, now abandoned, which is a continuation of application No. 08/277,944, filed on Jun. 24, 1994, now abandoned, which is a continuation of application No. 08/057,218, filed on May 4, 1993, now abandoned, which is a continuation of application No. 07/910,865, filed on Jul. 6, 1992, now abandoned, which is a continuation-in-part of application No. 07/980,947, filed on May 26, 1992, now abandoned, which is a continuation-in-part of application No. 07/826,960, filed on Jan. 24, 1992, now abandoned, which is a continuation-in-part of application No. 07/765,013, filed on Aug. 24, 1991, now abandoned, which is a continuation-in-part of application No. 07/727,256, filed on Jul. 9, 1991, now abandoned, which is a continuation of application No. 07/700,704, filed on May 14, 1991, now abandoned, which is a continuation-in-part of application No. 07/699,818, filed on May 13, 1991, now abandoned, which is a continuation-in-part of application No. 07/485,313, filed on Aug. 26, 1990, now abandoned, which is a continuation-in-part of application No. 07/288,355, filed on Aug. 4, 1988, now Pat. No. 4,910,794.

(51) Int. Cl.
*H04B 7/00* (2006.01)
*H04B 1/38* (2006.01)

(52) U.S. Cl. .................... 455/517; 455/550.1; 455/560

(58) Field of Classification Search ............ 455/67.11, 455/67.14, 73, 502, 503, 517, 524, 525, 552.1, 455/553.1, 560, 561; 370/346, 347, 464, 370/465
See application file for complete search history.

(56) References Cited

U.S. PATENT DOCUMENTS

| | | | | |
|---|---|---|---|---|
| 4,332,026 A | * | 5/1982 | Alvarez et al. | 370/347 |
| 4,698,805 A | * | 10/1987 | Sasuta et al. | 370/327 |
| 4,739,288 A | * | 4/1988 | Ide et al. | 332/100 |
| 4,788,543 A | * | 11/1988 | Rubin | 455/73 |
| 4,841,437 A | * | 6/1989 | Lubarsky et al. | 714/712 |
| 4,850,032 A | * | 7/1989 | Freeburg | 455/503 |
| 4,866,667 A | * | 9/1989 | Shimada | 710/316 |
| 4,910,794 A | * | 3/1990 | Mahany | 455/67.14 |
| 4,984,247 A | | 1/1991 | Kaufman et al. | 375/1 |
| 5,019,966 A | * | 5/1991 | Saito et al. | 710/29 |
| 5,090,013 A | * | 2/1992 | Fadem | 370/449 |
| 5,109,390 A | * | 4/1992 | Gilhousen et al. | 370/335 |
| 5,181,200 A | * | 1/1993 | Harrison | 455/525 |

FOREIGN PATENT DOCUMENTS

GB          2288249  A  *  10/1995
JP         62222346  A  *   9/1987

* cited by examiner

*Primary Examiner*—Quochien B. Vuong
(74) *Attorney, Agent, or Firm*—McAndrews, Held & Malloy, Ltd.

(57) ABSTRACT

Improved apparatus for a radio communication system having a multiplicity of mobile transceiver units selectively in communication with a plurality of base transceiver units which communicate with one or two host computers for storage and manipulation of data collected by bar code scanners or other collection means associated with the mobile transceiver units. A network controller provides selective interface means to be employed between the host computers and the base transceivers whereby low data rate base transceivers may be utilized with the network controller while spread spectrum or high data rate networked base transceivers may be also utilized. The network controller may allow selection of interface means for three of its ports from its front panel with use of three input keys. The network controller is entirely external to the host computer or computers, and can couple to a variety of commonly encountered host ports. Most preferable one- or two-network controller ports can each be software configured to match any needed host port, so that the host computer(s) need not be adapted to a radio network protocol accommodating the multiple base transceiver units.

27 Claims, 13 Drawing Sheets

SYSTEM FOR COUPLING A MULTIPLICITY OF RF DATA COLLECTION TERMINALS WITH HOST COMPUTER MEANS

CROSS REFERENCE TO RELATED APPLICATIONS

The present application is a continuation in part of co-pending U.S. patent application Ser. No. 10/057,816 filed on Jan. 24, 2002, which is a continuation in part of U.S. patent application Ser. No. 09/934,457 filed on Aug. 21, 2001, now abandoned, which is a continuation of U.S. patent application Ser. No. 08/551,442 filed on Nov. 1, 1995, now abandoned, which is a continuation of U.S. patent application Ser. No. 07/910,865 filed on Jul. 6, 1992, now abandoned, which is a continuation in part of U.S. patent application Ser. No. 07/980,947 filed on May 26, 1992, now abandoned, which is a continuation in part of U.S. patent application Ser. No. 07/826,960 filed on Jan. 24, 1992, now abandoned, which is a continuation in part of U.S. patent application Ser. No. 07/765,013 filed Aug. 24, 1991, now abandoned, which is a continuation in part of U.S. patent application Ser. No. 07/727,256 filed on Jul. 9, 1991, now abandoned, which is a continuation in part of U.S. patent application Ser. No. 07/485,313 filed on Aug. 26, 1990, now abandoned, which is a continuation in part of U.S. patent application Ser. No. 07/288,355 filed Aug. 4, 1988, now U.S. Pat. No. 4,910,794 which issued on Mar. 20, 1990. The present application is a continuation of U.S. patent application Ser. No. 08/277,944 filed Jun. 24, 1994, now abandoned, which is a continuation of U.S. patent application Ser. No. 08/057,218 filed on May 4, 1993, now abandoned, which is a continuation of U.S. patent application Ser. No. 07/700,704 filed on May 14, 1991, now abandoned, which is a continuation in part of U.S. patent application Ser. No. 07/699,818 filed on May 13, 1991, now abandoned. The present application also incorporates herein by reference U.S. patent application Ser. No. 08/486,083 filed on Jun. 7, 1995, now U.S. Pat. No. 5,844,893 issued on Dec. 1, 1998.

BACKGROUND OF THE INVENTION

The present invention in a preferred implementation relates to improvements in radio data communication systems wherein a number of mobile transceiver units are to transmit data to a number of base stations under a wide range of operating conditions. The invention is preferably to be applicable as an upgrade of an existing data capture system wherein a number of hand-held transceiver units of an earlier design are already in the field representing a substantial economic investment in comparison to the cost of base stations, accessories and components. In installations spread over an extensive area, a large number of mobile portable transceiver units may be employed to gather data in various places and multiple base stations may be required. In a variety of such installations such as warehouse facilities, distribution centers, and retail establishments, it may be advantageous to utilize not only multiple bases capable of communication with a single host, but with multiple hosts as well.

An early RF data collection system is shown in Marvin L. Sojka, U.S. Pat. No. 4,924,462 assigned to the assignee of the present application. This patent illustrates (in the sixth figure) a NORAND® RC2250 Network Controller which supports one base transceiver for communication with multiple mobile portable transceivers. The exemplary prior art device is capable of communicating with a host computer through an RS232C interface at up to 19,200 baud in asynchronous mode. In order for an optional RS422 interface to be substituted for an RS232C interface, the unit must be opened and substitute circuitry components installed within it.

SUMMARY OF THE INVENTION

The present invention provides an improved network controller to serve as a consolidation link between one or more host computers and one or more base transceiver units, each of which may be communicative with many mobile portable transceiver units being moved about a warehouse complex for the collection of data. The network controller invention provides a front panel display with three operator-available control keys for selections of function and up or down scrolling through choices provided on the front panel display.

The invention will allow incorporation with existing base transceivers as well as with high-speed spread spectrum and synthesized radio networks at the same time. The invention allows the creation of a radio communication system with multiple host devices using differing communication protocols. Higher speed host device interfaces may be used as a result of the inclusion of the invention in an existing radio communication system. The invention provides means for the coupling of large networks of serially interconnected base transceivers over a single twisted pair of wires.

The invention provides a plurality of communication ports for interconnection to one or more host computers and one or more base transceiver systems or units. The communication ports available for connection with the host computers may be configured to provide selective interfaces without any requirement for rewiring or other hardware modification. A first port of the controller may be selected to interface with a host computer by either RS232 or V.35 means. The selection of interface means may be performed by the end user with choices made on the front panel control keys of the device.

A second port of the invention may be selected to provide interface means by a choice of RS232, RS422, or RS485 means or through a NORAND® Radio One Node Network proprietary interface. This second port may be communicative with a second host computer or with existing installed base units when RS232 means are selected, or with existing base units when RS422 means are selected. In addition, the second port may be configured to communicate with a network of new generation base units, either by RS485 interface protocol, or by the NORAND® Radio One Node Network proprietary interface.

The third port of the invention, like the second port hereof, may be selectively configured to communicate by RS232, RS422, RS485 or NORAND® Radio One Node Network proprietary interface means. For both the second and third ports, as well as for the host port, configuration of the port is accomplished by selection of the port on the front panel of the invention controller with the select key and then selection of the desired interface configuration through appropriate use of the up and down keys to scroll to the correct means to be selected. Because the invention permits internal, software-controlled, selection of the desired interface means for each port, the end user may easily self configure the unit for a particular use, thereby providing a highly versatile device. In addition the configuration choice means is simplified for the user, because the choices are conveniently displayed on the front panel display and a choice can be made from a scrollable list.

The introduction of the selectable RS485 interface in the present invention enables the controller to be interfaced to a network of new generation base station units which may comprise several base transceiver units configured on a single network circuit.

The inclusion of the selectable NORAND® Radio One Node Network proprietary interface means for the second and the third ports provides means for incorporation of new generation base transceiver units having particularized wiring and control requirements.

A diagnostic port configured for RS232 interface means is provided to provide selective communication, either remotely through modem means, or through direct coupling, with diagnostic and reprogramming apparatus.

The invention is provided with an application specific integrated circuit used in combination with a control processor unit capable of a speed of 16.667 mhz with direct memory access functionality available at its communication ports. Internal memory components to be coupled to the central processor unit and application specific integrated circuit will comprise nonvolatile electrically eraseable programmable read only memory elements, dynamic random access memory elements, and nonvolatile FLASH memory elements which permit erasure by application of +12VDC to prescribed pins.

Power supply means are supplied exteriorly to the invention in order to make the invention standardized for United States, European and other countries' local power company output characteristics.

It is therefore an object of the invention to provide a radio communication system which permits the interconnection of one or two host computer devices to a multiplicity of base transceiver units which may include both prior art existing installed units and new generation units capable of spread spectrum or synthesized radio transmission.

It is a further object of the invention to provide a radio communication system network controller which may allow interconnection of a multiplicity of devices which are operating with non-uniform electrical interface characteristics.

It is a further object of the invention to provide a radio communication system network controller which may be configured for varying interface requirements by operation of a limited number of front panel keys.

It is a further object of the invention to provide a radio communication system network controller which will allow utilization of single twisted pair networks of serially networked base transceiver units, each of which being communicative with a large number of individual mobile data collection transceiver units.

These are other objects of the invention will be apparent from examination of the detailed description which follows.

DESCRIPTION OF THE DRAWING FIGURES

DETAILED DESCRIPTION OF THE INVENTION

Figure 1:
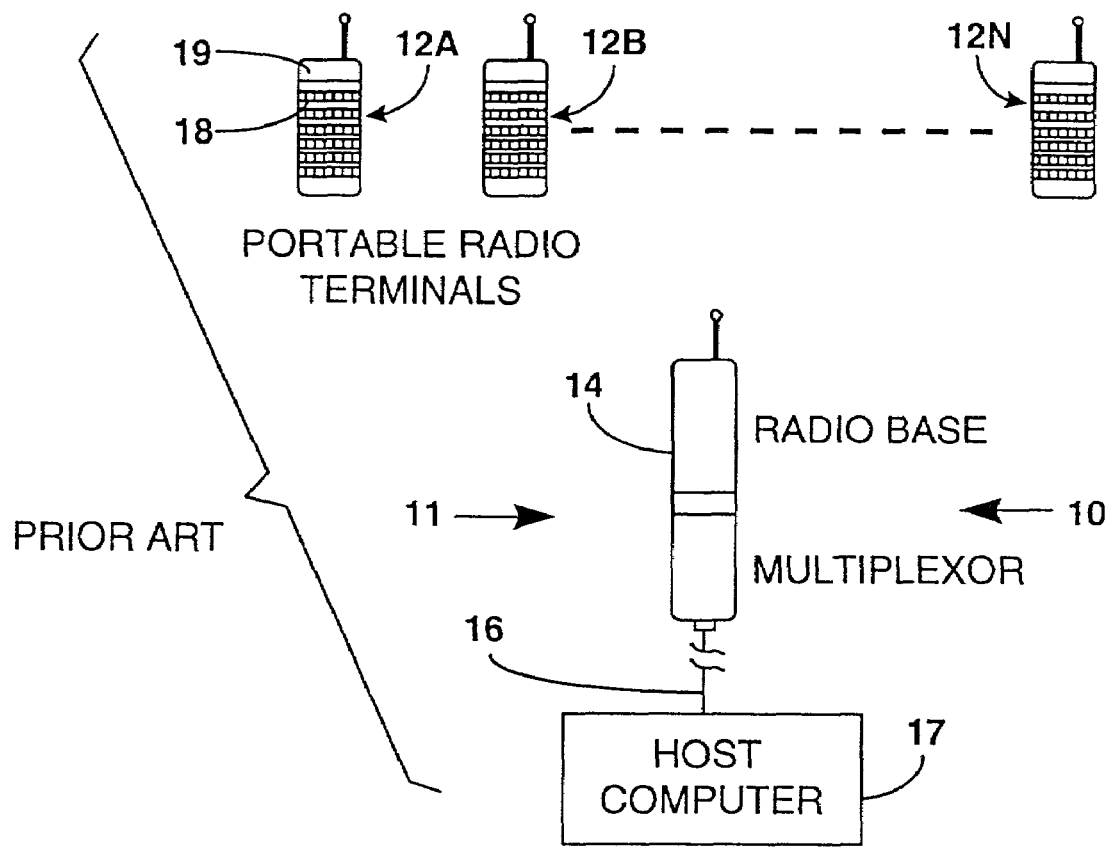
FIG. 1 is a block diagram of the prior art data communication system.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB3021 of Norand Corporation, Cedar Rapids, Iowa, which forms part of a product family known as the RT3210 system. In this case, the radio base 14 may receive data from the respective mobile RF terminals, e.g. of type RT3210, and transmit the received data via a network controller and a communications link 16 (e.g. utilizing an RS-232 format) to a host computer 17.

The data capture terminals 12A, 12B, . . . , 12N may each be provided with a keyboard such as 18, a display as at 19, and a bar code scanning capability, e.g. via an instant bar code reader such as shown in U.S. Pat. No. 4,766,300 issued Aug. 23, 1988 and known commercially as the 20/20 High Performance Bar Code Reader of Norand Corporation.

Figure 2:
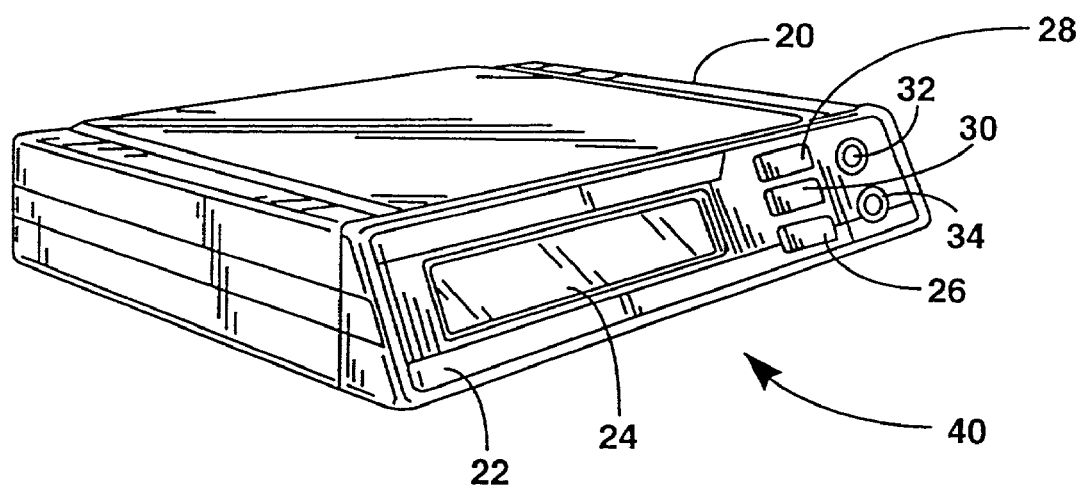
FIG. 2 is perspective view of the invention.

FIG. 2 provides a perspective view of the invention 40 in the preferred embodiment case 20. Front panel 22 is provided with display 24 and select key 26, up key 28 and down key 30. Power indicator 32 comprises a low power green light emitting diode which is energized when power is supplied to the invention 10. Error condition indicator 34 is a yellow LED which is software controlled to be energized if the invention 10 is in error condition.

Figure 3:
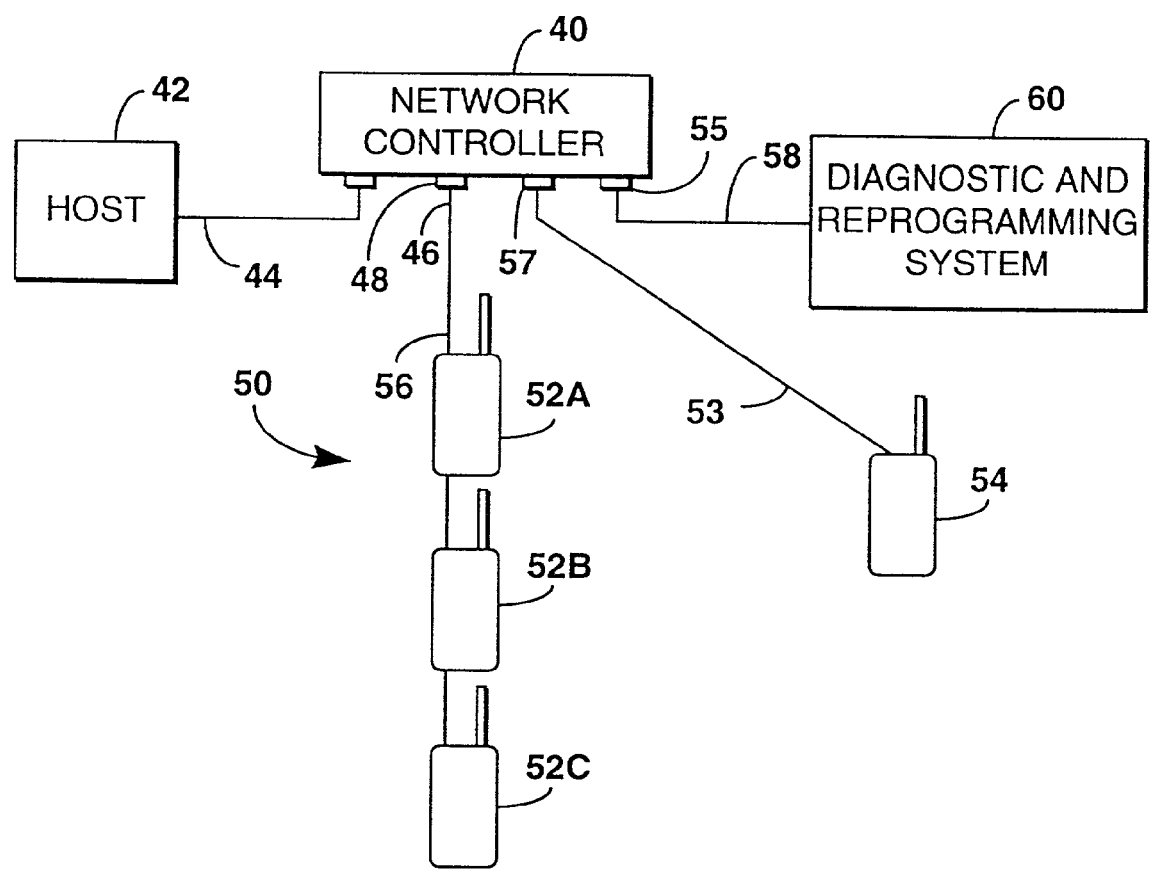
FIG. 3 is a schematic representation of an exemplary radio communication system utilizing the invention.

FIG. 3 discloses a diagrammatic illustration of a radio communication system in accordance with the present invention. Invention network controller 40 is coupled to host computer 42 such that data may be interchanged between the devices over host communications link 44, which may be either in an RS232C format or selectively in an RS422 format. The host communication link 44 couples to controller 40 at host port 46.

First communication port 48 of controller 40 provides means for coupling of network 50 to controller 40. Network 50 comprises a number of base RF transceiver units 52A, 52B and 53B, each of which may be selectively employed in the radio frequency communication of data from mobile transceiver units. It is to be understood that base transceiver units 52 are designed and equipped to be operable in the exchange of data with network controller 40 over network link 56 such that each base transceiver unit 52A, 52B, or 53C may independently exchange data with network controller 40 through first communication port 48. When first communication port 48 is intended for operation with a network such as network 50 of base transceiver units 52A, 52B and 53C, for example, network controller 40 is selectively operated to provide an RS485 interface at first communication port 48. First communication port 48 may be alternately selected to operate as an RS232C interface, as an RS422 interface, as a proprietary NORAND® Radio One Node Network interface or as a high speed V.35 interface. The selection of interface to be provided at first communication port 48 is front panel controlled, that is, the user may operate front panel keys 28, 30 and 26 (See FIG. 2) to direct the proper interface to be provided at first communication port 48.

Base transceiver units 52A, 52B, and 52C are coupled to network link 56 by serial means, rather than parallel means, and each may be caused to transmit or to receive independently from the others while additionally being communicative with network controller 40 in a randomly chosen fashion.

It is further to be understood that interface translation is provided within controller 40 such that data communicated at first communication port 48 may be directed to host 42 at port 46 via properly chosen interface means as is required by the host 42 with which communication is intended.

Like first communication port 48, second communication port 57 may be internally switched among interface choices of these types: RS232C, RS422, V.35, RS485 and proprietary NORAND® Radio One Node Network interface. In the illustrated arrangement of FIG. 3, for example, second communication port 57 is coupled over third link 53 to previously installed base transceiver 54, which heretofore had been used in a prior art system as is illustrated in FIG. 1. Because of limitations of base transceiver 54, it must communicate via RS232C interface format and therefore, second communication port 57 must be selected to operate in RS232C interface mode. However, when second communication port 57 is desired to communicate with a network via RS485 interface, front panel keys 26, 28 and 30 may be manipulated by the user to provide the RS485 interface availability at second communication port 57. Likewise, second communication port 57 may be selected to operate as an RS422 interface, as a V.35 interface, or as the proprietary NORAND® Radio One Node Network interface.

Diagnostic port 55 provides a fourth communication pathway for network controller 40, providing an asynchronous port operable at 300 to 19,200 baud as an RS232C interface. When desirable, diagnostic port 55 may be coupled by diagnostic link 58 to diagnostic device 60 for purposes of error diagnosis of controller 40 by diagnostic device 60, or for reprogramming of memory devices within controller 40 when desired. It is contemplated that diagnostic device 60 comprises a 16-bit microprocessor commonly known as a personal computer or "PC". The mode of coupling between diagnostic device 60 and network controller 40 may be direct or through remote means by use of a modem.

Figure 4:
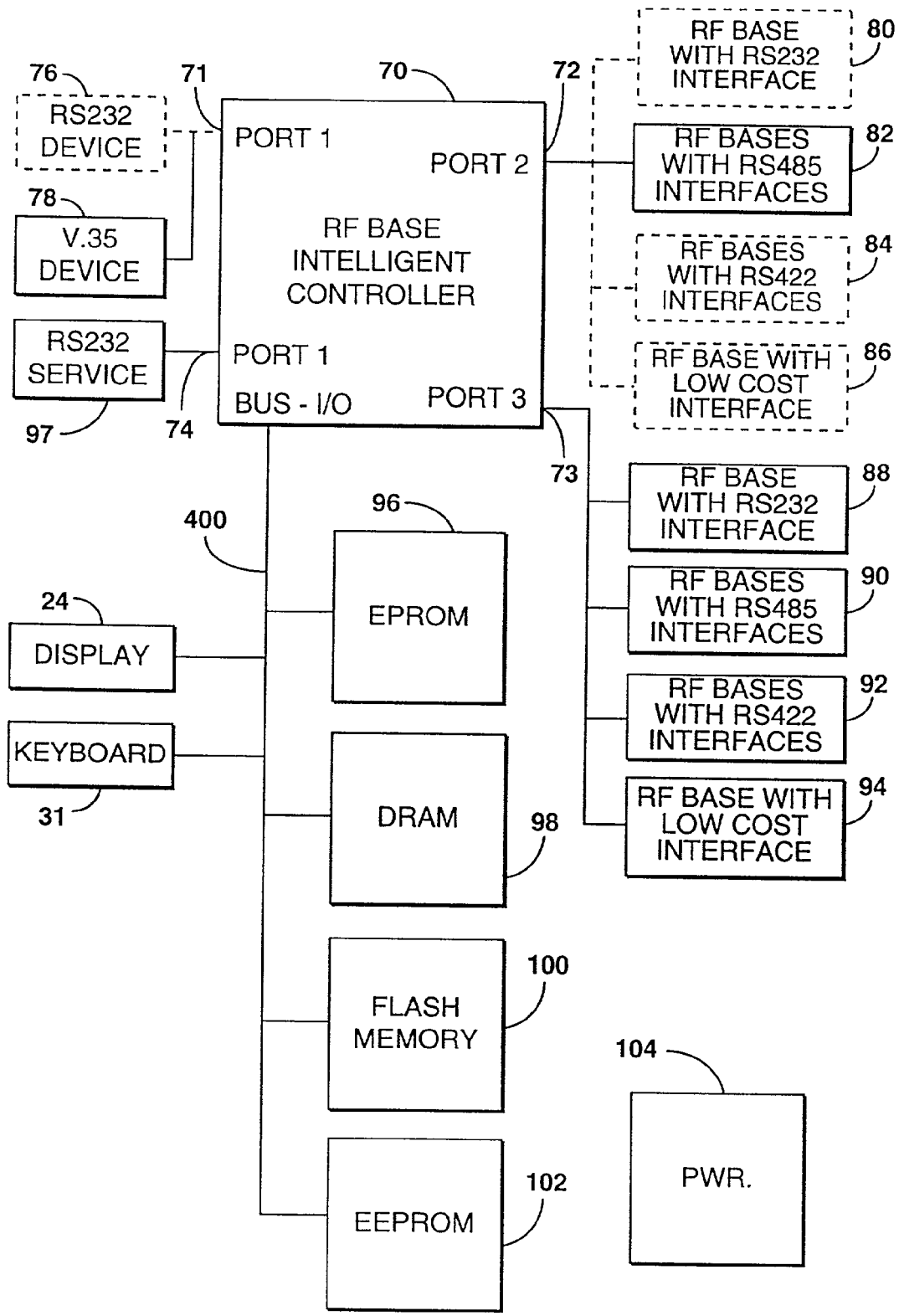
FIG. 4 is a diagrammatic illustration of the control circuitry elements of the invention.

Referring now to FIG. 4, a central processing unit 70 is provided with at least four data communication ports, illustrated at numerals 71, 72, 73, and 74. First data communication port 71 may be selectively coupled to RS232 interface member 76 or V.35 interface member 78. The choice of whether RS232 interface member 76 or V.35 interface member 78 is chosen is dependent upon the operating characteristics presented by the host computer, such as host computer 42 of FIG. 3, with which network controller 40 will communicate. The choice of whether first communication port 71 is coupled to interface member 76 or to interface member 78 depends on the front panel selection made by the user by keys 26, 28, and 30 shown in FIG. 2.

Second communication port 72 may be selectively coupled to RS232 member 80 or to RS485 interface member 82 or to RS422 interface member 84 or to NORAND® Radio One Node Network proprietary interface member 86. By use of front panel keys 26, 28, and 30 of FIG. 2, the user may select second communication port 72 to be coupled to any one of interface members 80, 82, 84, and 86.

Third communication port 73 is identical to second communication port 72 in functionality, being selectively couplable to RS232 interface member 88, to RS485 interface member 90, to RS422 interface member 92 or to NORAND® Radio One Node Network proprietary interface member 94.

In the preferred embodiment of the invention 40, central processing unit 70 of FIG. 4 comprises a Motorola™ 68302 integrated chip cooperative with an application specific integrated circuit. Central processing unit 70 employs novel features allowing the bidirectional use of a data communicative line of the Motorola™ 68302 chip and a single clock signal line to eliminate the need for coder-decoder members to be associated with the Motorola™ 68305 chip while allowing the use of only one pair of signal wires to be coupled to the RS485 interfaces 82 and 90 of FIG. 4.

Fourth communication port 74 of central processing unit is coupled to asynchonous RS232 interface member 97 to be available for interconnection of a diagnostic device therewith.

Also coupled to central processing unit 70 are display member 24 and keyboard member 31 with which keys 26, 28, and 30 of front panel 22 (FIG. 2) are interactive.

Memory elements including EPROM element 96, DRAM unit 98, FLASH memory unit 100 and EEPROM element 102 are intercoupled with each other and with central processing unit 70.

Power supply member 104 is selectively attachable to invention network controller 40. In order to avoid the necessity of different models of network controller 40 depending on the local electrical power utility's operating characteristics, power supply 104 is provided in optional models depending on the country in which it is to be used, power supply 104 being capable of providing satisfactory output power to network controller 40 regardless of the voltage or frequency of the input source provided to power supply 104

Figure 6:
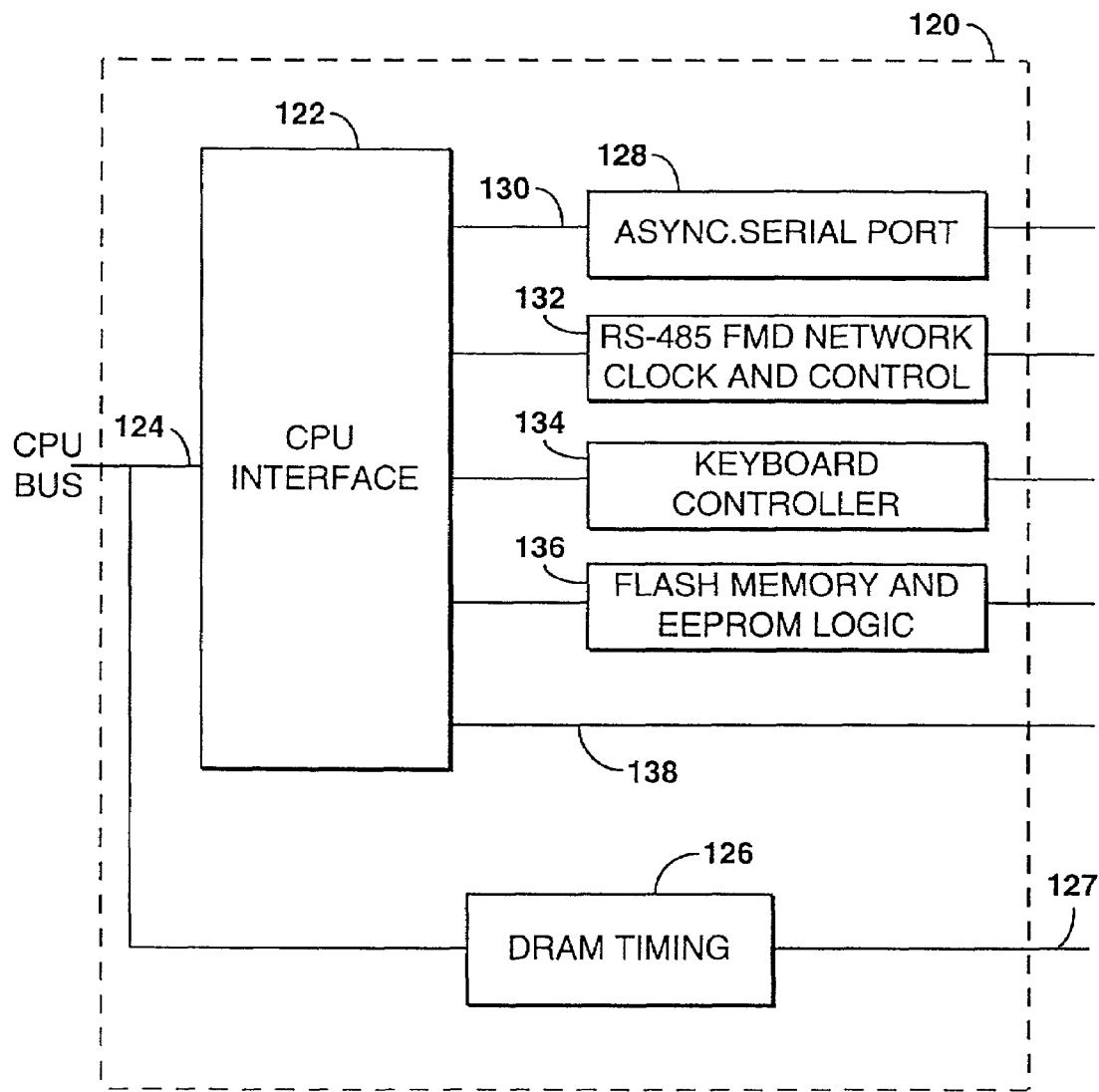
FIG. 6 is a diagrammatic illustration of the application specific integrated circuit of the invention.

The application specific integrated circuit (ASIC) used in the invention network controller 40 is disclosed in FIG. 6 and is identified by the numeral 120. ASIC 120 comprises a central processor unit interface 122 member which is coupled to the central processor unit bus by CPU bus link 124 which extends from ASIC 120. Also coupled to the CPU bus link 124 is dynamic random access memory (DRAM)

timing element 126, which provides network controller 40 with timing signals for the DRAM member 98 illustrated in FIG. 4 when memory refresh of the DRAM 98 is indicated. DRAM timing element 126 is also coupled exteriorly to the ASIC 120 to DRAM member 98 by DRAM link 127.

Central processing unit interface 122 is coupled to asynchronous signal processing element 128 by signal path 130. Asynchronous signal processing element 128 comprises a baud rate generator cooperative with a universal asynchronous receiver-transmitter.

Also coupled to central processing unit interface 122 is network clock and control member 132 which comprises a programmable network clock generator which can be selectively programmed to generate an optional clock speed for a network to be coupled through RS485 interfaces 82 and 90 seen in FIG. 4. Network clock and control member 132 also provides detection means for detections of failure conditions on a linked network and provides control signals to system components in response thereto, including interrupt signals to programmable interrupt coordinator circuity included in central processing interface 122. Network clock and controller member 132 provides data encoding by the FM0 standard, then the encoded data may be operated upon by RS485 interfaces 82 and 84 and transmitted and received by single twisted pair means to multiple serially networked base transceiver units exemplified by base transceiver units 52A, 52B, and 52C illustrated in FIG. 3.

Keyboard controller element 134 is coupled to central processing unit interface and provides a link exterior to ASIC 120 to keyboard 31 (See FIG. 3).

FLASH memory/EEPROM logic control member 136 is coupled to central processing unit interface 122 and comprises control functions for FLASH memory element 100 and EEPROM memory element 102 of FIG. 3.

Central processing unit interface 122 is also coupled by line 138 to latches exterior to ASIC 120.

It is to be understood that the base transceiver units 52A, 52B, and 52C illustrated in FIG. 3 are communicative with mobile transceiver units by electromagnetic radio means. The mobile transceiver units may be associated with bar code scanning devices such as the NORAND® 20/20 High Performance Bar Code Reader whereby the scanning devices scan an object having a bar code associated therewith and collect information stored in the bar code, which information is then transmitted through the mobile transceiver units to base transceiver units such as base transceiver units 52A, 52B, and 52C or base transceiver unit 54 of FIG. 3. The bar code data received by said base transceiver units is then transmitted, in the example of FIG. 3, over network 50 by base transceiver units 52A, 52B, or 52C, or over link 53 by base transceiver unit 54, to network controller 40 which performs the routing and delivery of the data to the stationary data processor, or processors, such as shown for example, by host 42 of FIG. 3.

Description of FIGS. 7 through 11

Figure 7:
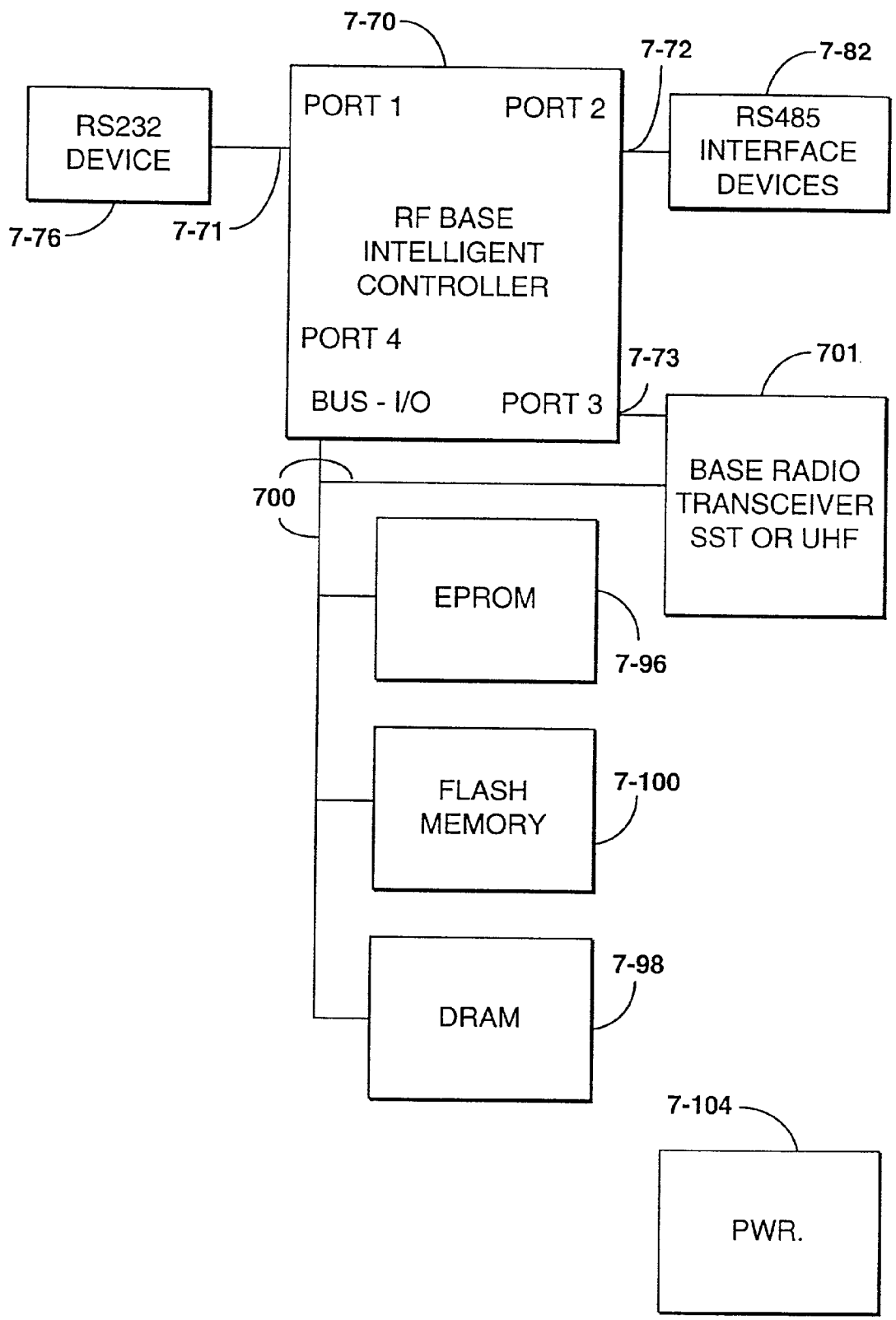
FIG. 7 is a block diagram showing an exemplary implementation of intelligent network and router transceiver units such as the network transceiver units of FIG. 3.

FIG. 7 shows a block diagram of a particularly preferred intelligent base transceiver unit known as the RB4000. It will be observed that the components correspond with components of the network controller of FIG. 4, and similar reference numerals (preceded by 7-) have been applied in FIG. 7. Thus, the significance of components 7-70 through 7-73, 7-76, 7-82, 7-96, 7-98, 7-100 and 7-104 will be apparent from the preceding description with respect to FIGS. 4 and 6, for example. I/O bus 700 may be coupled with a spread spectrum transmission (SST) or ultra high frequency (UHF) transceiver 701 which may correspond with any of the transceivers of units 52A, 52B, 52C or 54 previously referred to. The network controller 70 could have a similar RF transceiver coupled with its data port 72 or 73 and controlled via input/output bus 400, e.g. for direct RF coupling with router transceivers such as 901, 901, FIG. 9.

Figure 8:
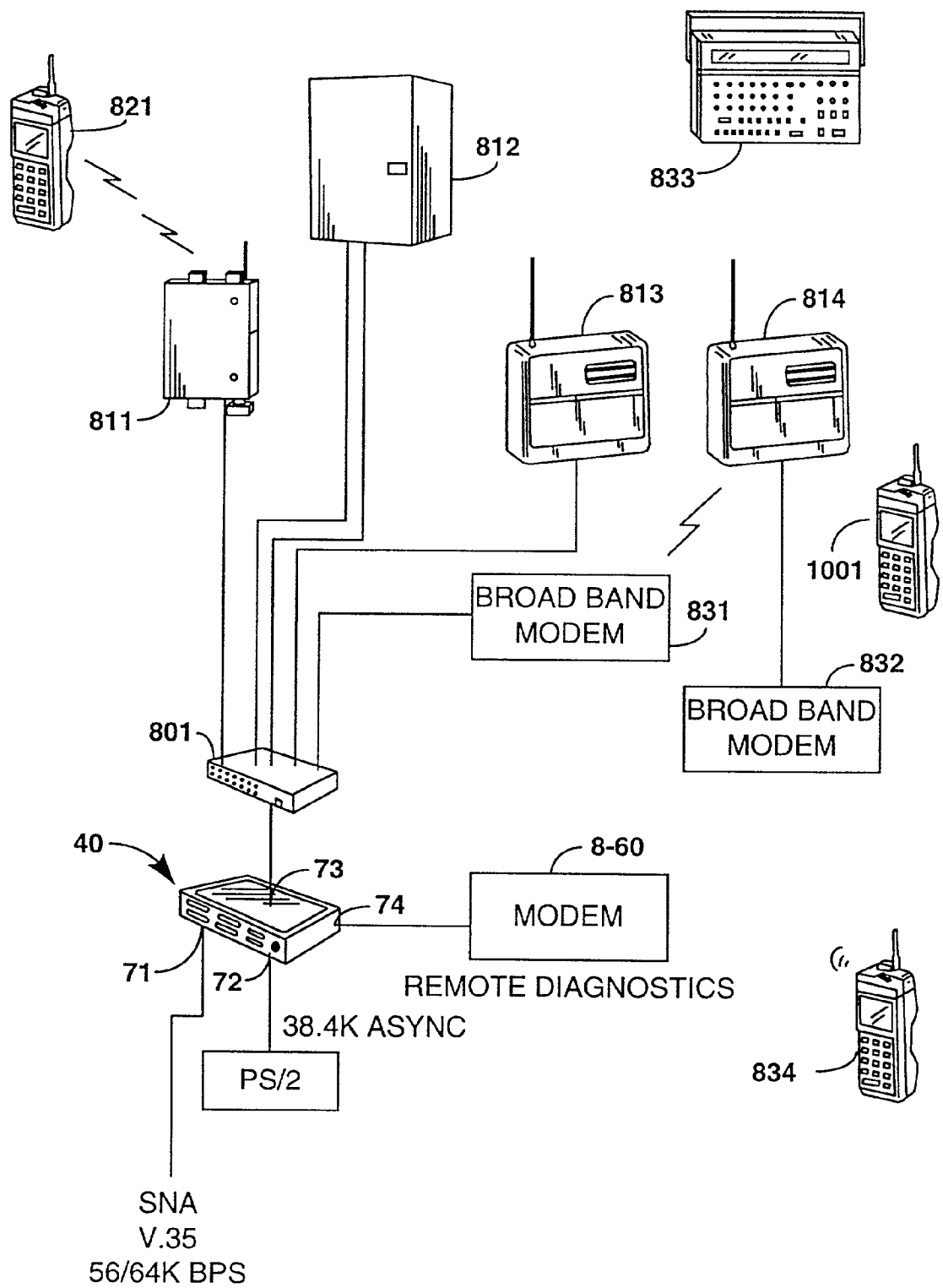
FIG. 8 is a diagram of an RF system utilizing a network controller according to FIGS. 2–6, with one of its network ports configured for communication with a second host, and another of its ports coupled with a multiplicity of RF transceivers via an adapter unit.

Referring to FIG. 8, a network controller 40 is shown with port 71 configured for interface with a host port type SNA V.35 56K/64K bits per second. Port 72 is shown as configured for communication with a personal computer of the PS/2 type operating asynchronously at 38.4K bits per second. Port 74 is coupled with a modem 8-60 providing for remote diagnostics and reprogramming of the network controller 40.

Port 73 of network controller 40 is shown as being connected with an adapter component 801 known as the MBA3000. A specification for the MBA3000 is found in APPENDIX A following this detailed description. In the operating mode indicated in FIG. 8, the adapter 801 serves to couple controller 40 sequentially with four radio base transceiver units such as indicated at 811 through 814. Component 811 is a commercially available radio base known as the RB3021 which utilizes features of Sojka U.S. Pat. No. 4,924,462 and of Mahany U.S. Pat. No. 4,910,794, both assigned to the present assignee, and the disclosures of which are hereby incorporated herein by reference in their entirety. Base station 811 may communicate with a multiplicity of hand-held RF data terminals such as indicated at 821. Details concerning base transceiver units 812 and 813, 814 are found in the attached APPENDICES B and C, respectively. Base 814 is indicated as being coupled with the adaptor 801 via RF broadband modems 831 and 832. Base units 813 and 814 may communicate with a variety of mobile transceiver units such as those indicated at 833 and 834 which are particularly described in APPENDICES D and E.

Figure 9:
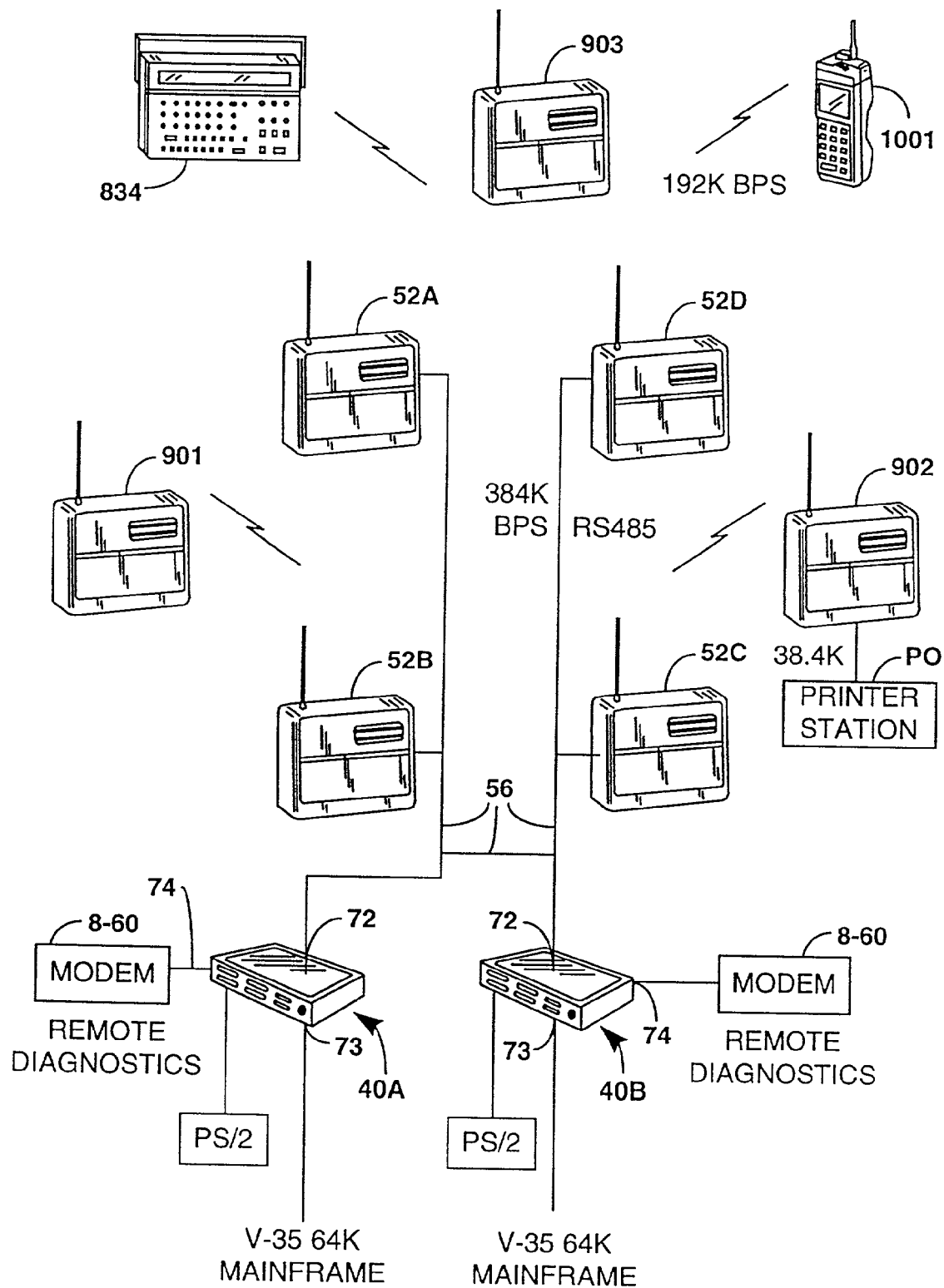
FIG. 9 is a diagram illustrating the use of two network controllers according to FIGS. 2–6, configured for dual host computers each, and having their relatively high data rate extended distance network ports coupled with a multiplicity of intelligent network and router transceiver units implemented according to FIG. 7.

FIG. 9 shows two network controllers 40A and 40B each with its host ports configured as with the controller 40 of FIG. 8. In this example, the second ports 72 of the controllers 40A and 40B are configured for communication a relatively high data rate relatively along a distance network channel 56 which may have the characteristics of the serial channel 56 of FIG. 3, for example, an RS485 channel operating at 384 kilobits per second (384K bps). Network base transceivers 52A, 52B and 52C may correspond with the correspondingly numbered transceiver units of FIG. 3, for example, and the network may have additional network transceivers such as 52D. Furthermore, the network transceivers may have RF coupling with router transceiver units such as indicated at 901, 902 and 903. Router transceiver unit 902 is illustrated as a RB4000 intelligent transceiver such as represented in FIG. 7 and having its input/output bus 700 coupled with a peripheral.

Figure 10:
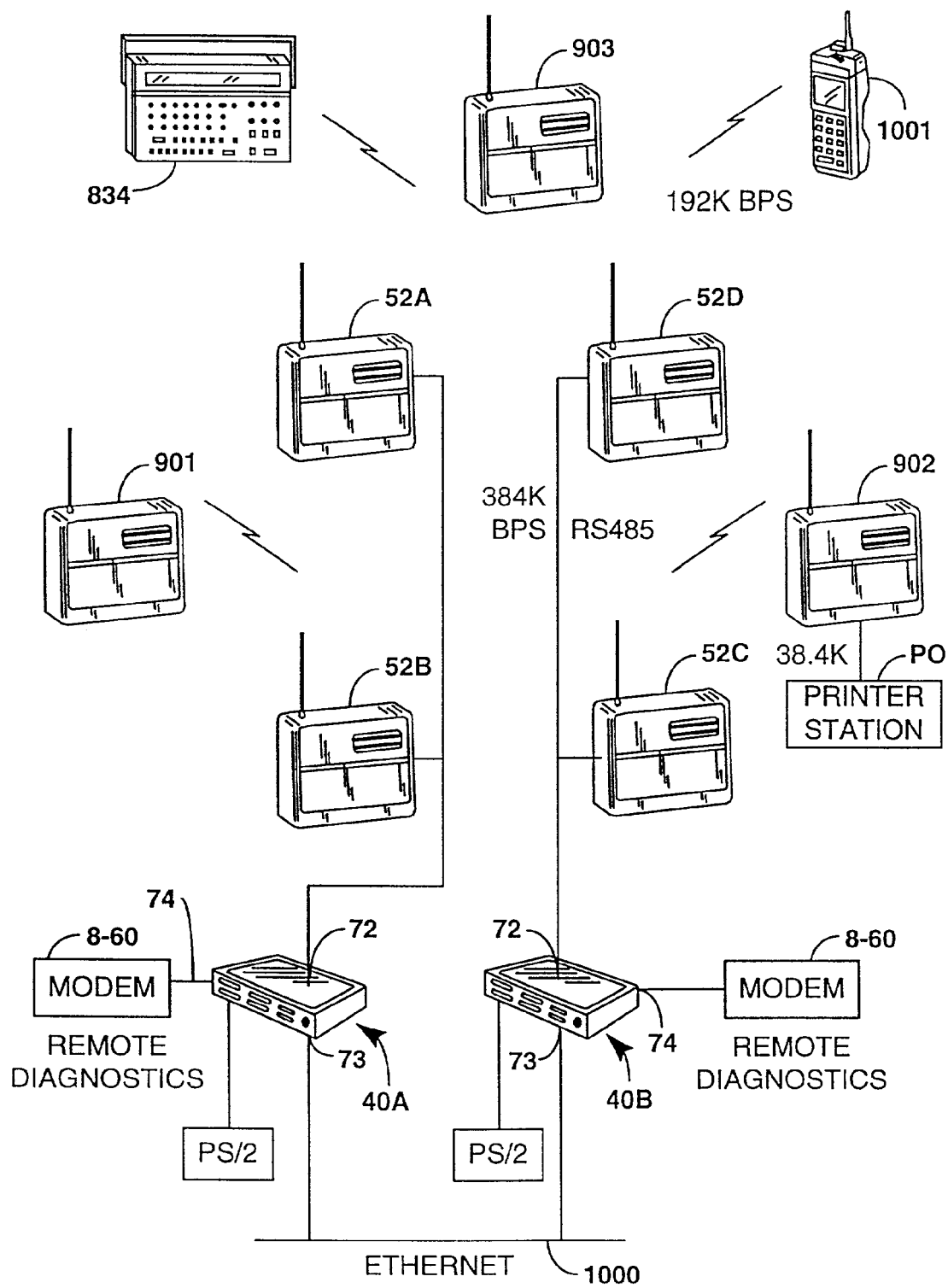
FIG. 10 is a diagram similar to FIG. 9 but showing the pair of coupled network controllers interfaced to a common relatively high data rate system having multiple hosts (e.g.) a local area network of the Ethernet type or equivalent e.g. fiber optic type).

FIG. 10 is entirely similar to FIG. 9, for example, except that ports 72 of the controllers 40A and 40B are coupled with separate serial type high data rate network channels, and ports 73 of the respective network controllers are coupled to a very high speed network e.g. in the megabit per second range such as an Ethernet local area network 1000. Suitable interfaces are indicated at 1001 and 1002.

Figure 11:
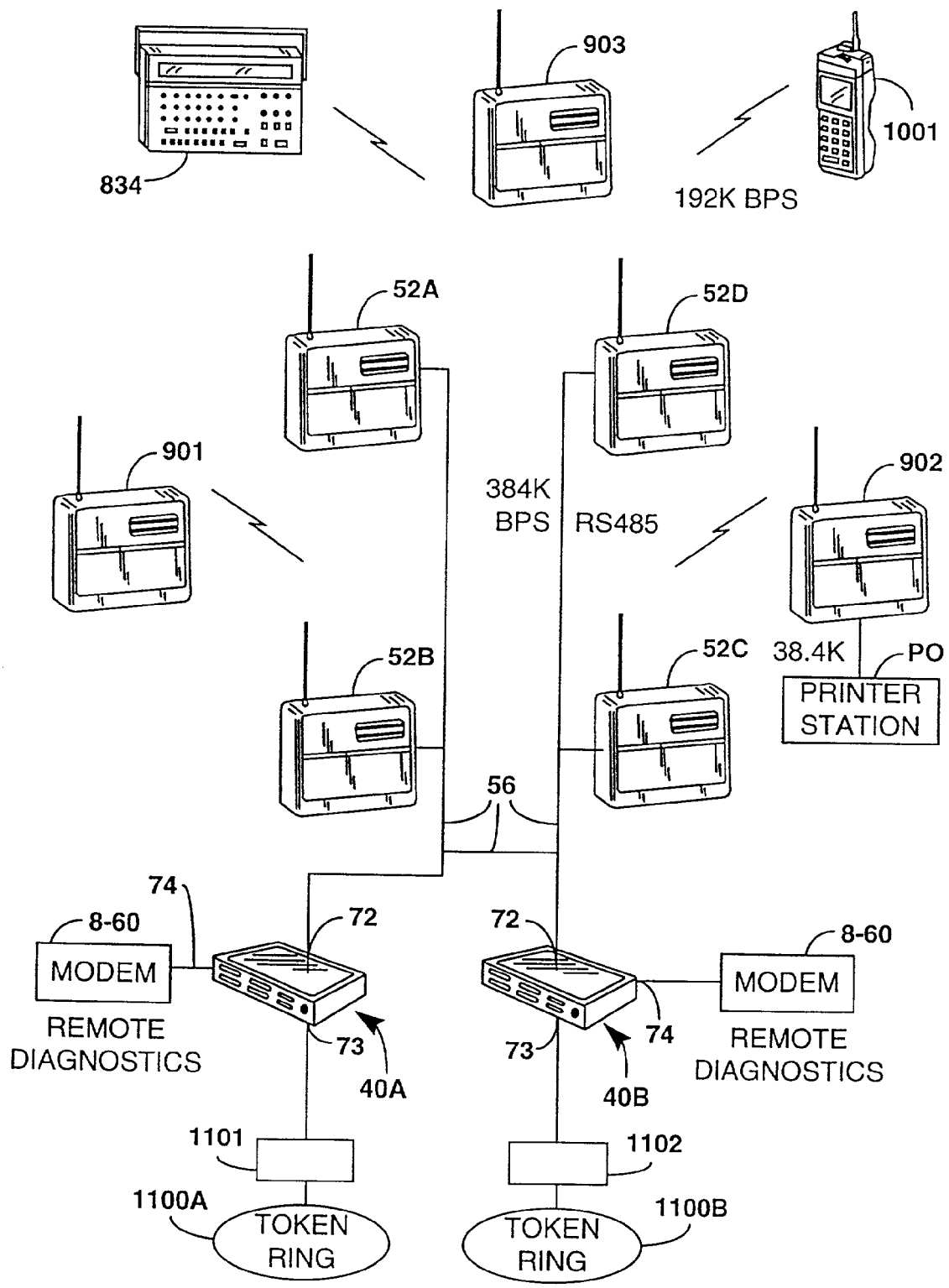
FIG. 11 is a diagram similar to FIG. 10 but indicating the network controllers being coupled to respective different high data rate multiple host systems (e.g. token ring type local area networks or other individual networks e.g. fiber optic loop networks of the collision-sense multiple-access type).

FIG. 11 is entirely similar to FIG. 9 except that the ports 73 of the network controllers 40A and 40B are coupled with respective local area ring type networks which may be separate from each other and each have two or more hosts such as represented in FIG. 9 associated with the respective ring networks such as token rings 1100A and 1100B. Suitable interface means are indicated at 1101 and 1102.

Figure 12:
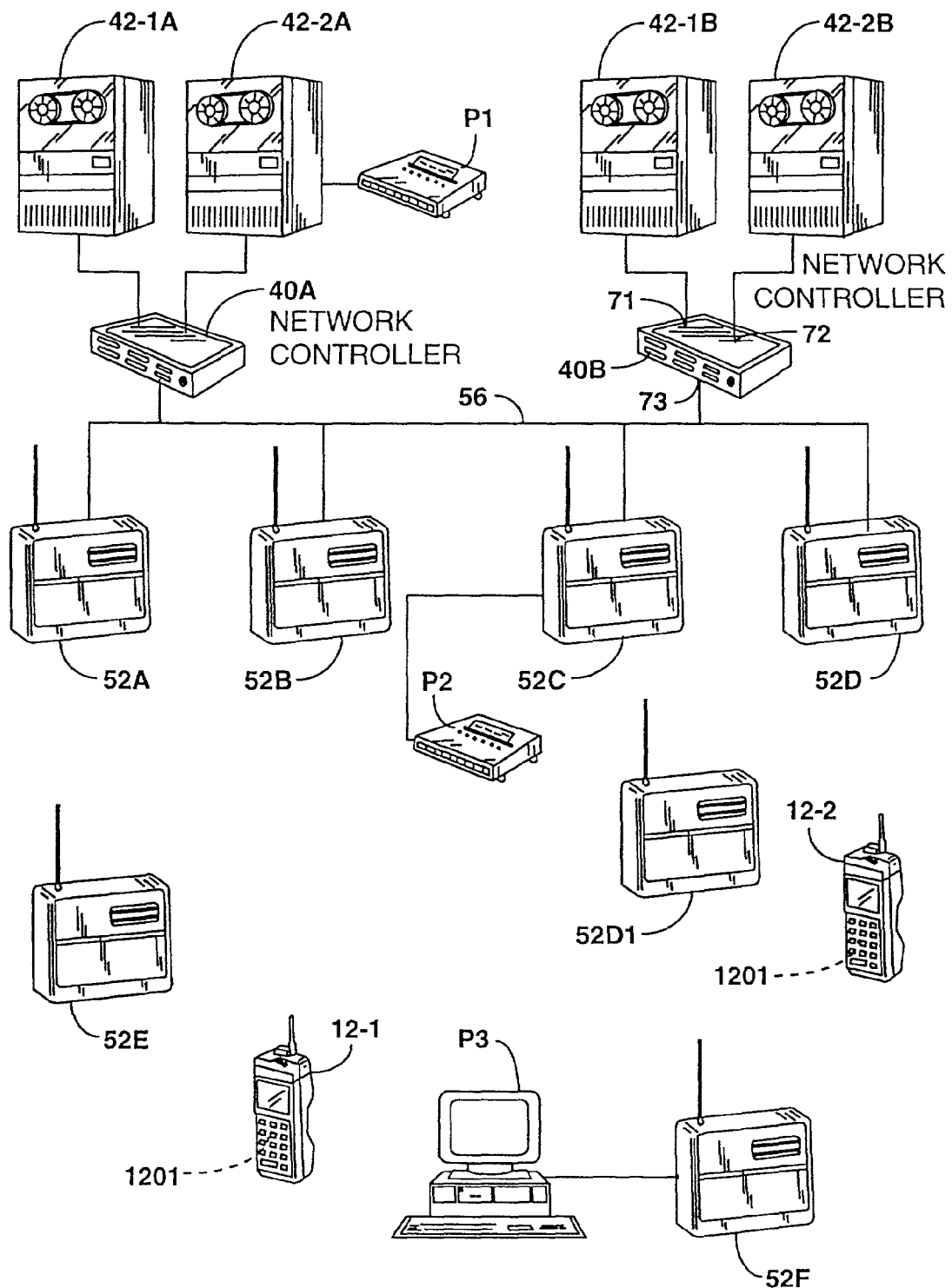
FIG. 12 is a view similar to FIG. 9 but intended to diagrammatically indicate a distribution of network and router transceivers and other elements of an on-line RF data collection system over an extensive area of a facility e.g. of one of the types previously mentioned.

Description of FIG. 12

FIG. 12 shows, for example, two network controllers 40A and 40B, each with two host computer units such as 42-1A. Host 42-2A is shown with a printer or other peripheral P1 which may generate bar codes, for example, for replacement of damaged bar codes or the like. Another printer P2 is shown associated with base 52C, again for example, for producing bar code labels where those are needed in the vicinity of a base station. In a large warehouse, relatively large distances may be involved for a worker to return to a printer such as P1 to obtain a new bar code label. Thus, it may be very advantageous to provide a printer P2 at the base station 52C which may be relatively close to a processing location which requires printed labels, e.g. a processing location in the vicinity of hand-held terminal 12-2 in FIG. 12. A base 52F may have a peripheral P3 associated therewith such as a large screen display, a printer or the like which may supplement the capabilities of a hand-held terminal, for example printing out new bar code labels at a convenient location, or providing a full screen display, rather than the more limited screen display area of the hand-held terminal 12-2.

If, for example, a base radio 52D which might be located at the ceiling level of a warehouse became inoperative at a time when qualified repair personnel were not immediately available, with the present system it would be feasible to provide a substitute base radio or base radios, for example, as indicated at 52D1 located at table level or the like.

With the present system, the base radio stations do not necessarily forward data communications received from a given terminal to a particular host. For example, hand-held terminal 12-2 may request a path to printer P2, and such a path may be created via base stations 52D1 and 52C. Station 52C upon receipt of the message from terminal 12-2 would not transmit the message to a host but would, for example, produce the desired bar code label by means of printer P2. Further, terminal 12-2 may have provision for digitizing a voice message which might, for example, be addressed to terminal 12-1. The system as illustrated would be operable to automatically establish a suitable path for example, via stations 52D1, 52C, 52B, 52E and 12-1 for the transmission of this voice message in digital form. Successive segments of such a voice message would be stored, for example, by the terminal 12-1, and when the complete message was assembled, the segments would be synthesized into a continuous voice message for the user of terminal 12-1 e.g. by means of a speaker 1201 also useful for sending tone signals indicating valid bar code read, etc.

In accordance with the present invention, a hardware system such as illustrated in FIG. 12 may be physically laid out and then upon suitable command to one of the network controllers such as 42-2B, the entire system would be progressively automatically self-configured for efficient operation. For example, controller 40B could successively try its communications options with its output ports such as 71–73, determining for example, that host processors were coupled with ports 71 and 72, one operating on a 38.4 kilobit per second asynchronous basis and the other presenting a SNA port for the V.35 protocol at 64 kilobits per second. For example, one host, 42-1B might be a main frame computer, while the other host 42-2B might be a PS/2 type computer system. The controller 40B having thus automatically configured itself so as to be compatible with the devices connected to ports 71 and 72, could proceed to transmit via port 73 a suitable inquiry message to the network channel 56. Each of the base stations could operate, for example, on a collision-sense multiple-access (CDMA) basis to respond to the inquiry message from the controller 40B, until each of the successive bases on the network had responded and identified itself. Each base, for example, would have a respective unique address identification which it could transmit in response to the inquiry message so as to establish its presence on the network.

The controller 40B could then transmit auto configure commands to the successive bases in turn, instructing the bases to determine what peripherals and router bases such as 52D1, 52E and 52F were within the range of such base, and to report back to the controller. For example, bases such as 52C and 52F could determine the nature of peripherals P2 and P3 associated therewith so as to be able to respond to an inquiry from a terminal such as 12-2 to advise the terminal that a bar code printer, for example, was within direct RF range.

In the case of a breakdown of a component of the system such as 52D, it would merely be necessary to place a router device such as 52D1 at a convenient location and activate the unit, whereupon the unit could send out its own broadcast inquiry which, for example, could be answered by the base stations 52C and 52F, station 52C in turn, advising a relevant host or hosts of the activation of a substitute router station. Thus, the system is conveniently re-self-configured without the necessity for a technician familiar with the particular configuration procedure. As another example, where the base stations are operating utilizing spread spectrum transmission, the introduction of barriers (such as a new stack of inventory goods) to such transmission between a given base such as 52A and various terminals, could result in the base 52A contacting router base 52E, for example, with a request to become active with respect to the blocked terminals.

Figure 13:
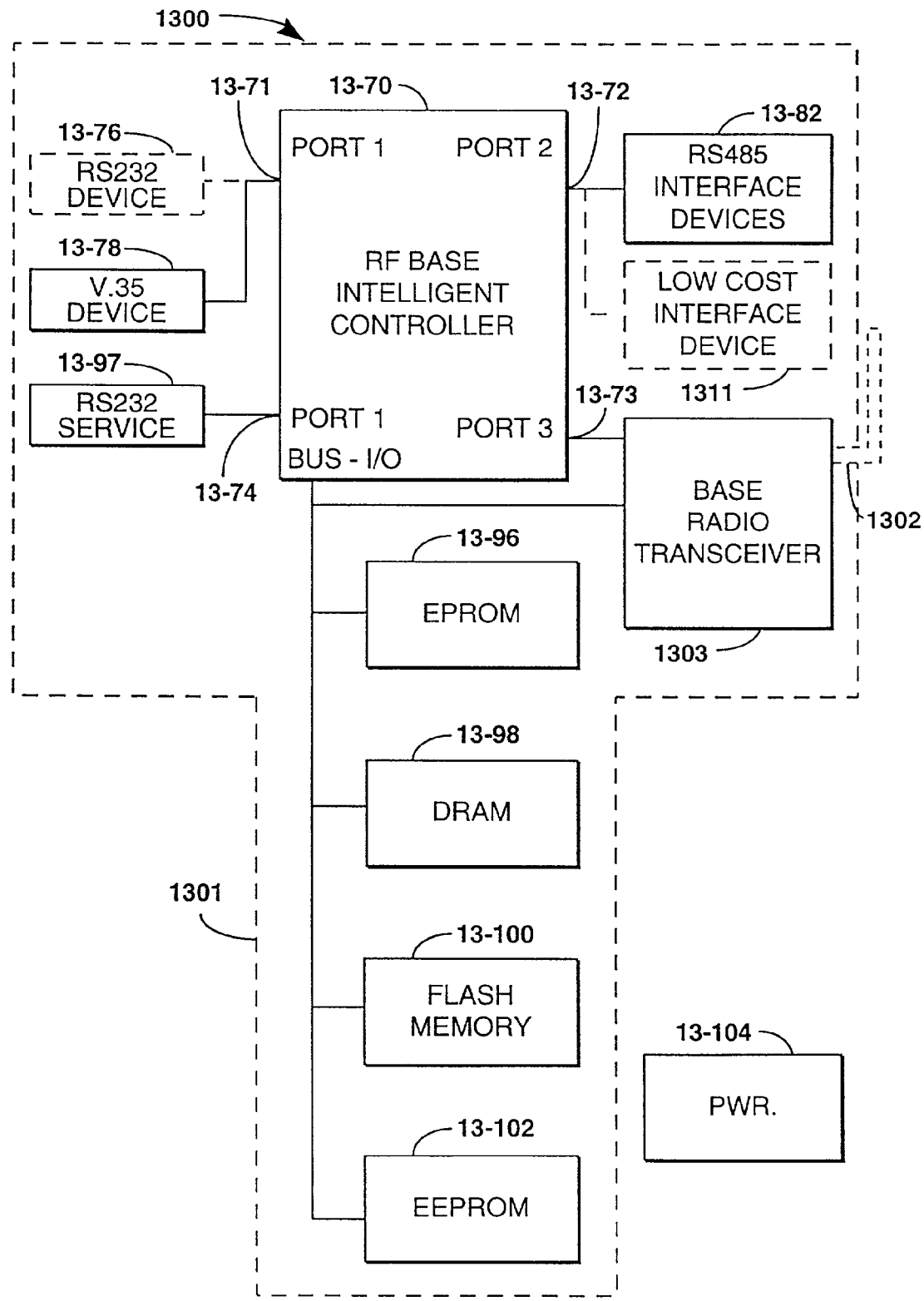
FIG. 13 shows an intelligent integrated controller and radio base unit which unifies controller and radio components such as shown in FIG. 7 into a single housing of the size represented in FIGS. 2 and 5.

Description of FIG. 13

FIG. 13 shows an intelligent integrated controller and radio base unit 1300 which is integrated into a single housing or case 1301 corresponding to the case or housing 20 of FIG. 2. The housing 1301 may be provided with an external antenna as diagrammatically indicated at 1302 with suitable RF coupling to the radio circuitry indicated at 1303. Components 13-70 through 13-74, 13-76, 13-78, 13-96, 13-97, 13-98, 13-100, and 13-102 may correspond with the correspondingly numbered components described with reference to FIG. 4.

Supplementary Discussion

In accordance with the present disclosure, a network controller, or integrated network controller and radio unit is coupled to one or more host computers via a standard interface such as commonly encountered in practice (e.g. RS232, V.35, Ethernet, token ring, FDDI, and so on). In this way, no specialized interface or adapter is required for the host.

Since the preferred network controller can connect to two hosts, if one host is detected to have failed, or in the event of a system crash, loss of a communication link, or the like, the network controller can automatically switch to the second host. The second host may be a truly redundant system, or may be a simpler computer of the PC type (a so-called personal computer) that can simply store transactions until the main host is restored. As another example, a single host may have a second port coupled to a second port of the controller especially if a communication link failure may be a problem. For example, two ports of the network controller may be coupled by separate modems with separate phone lines, leading to separate ports of a single mainframe computer, for example an IBM3090. In a fully redundant system, two ports of a network controller may be connected respectively to two mainframe computers such as the IBM3090.

The disclosed network controller can also connect one radio network to two hosts using RS232 or V.35 ports or to many hosts using a local area network such as Ethernet, token ring, or FDDI. A number of the disclosed network controllers (for example, up to thirty-two) can be connected together to interface many hosts to a single radio network. The hand-held portable terminals in such a network can then talk to any of the hosts they choose.

For example where one port of the disclosed network controller is coupled via its RS232 interface to a mainframe computer such as the IBM3090, another of its ports may be coupled via an FDDI network with a super computer e.g. the Cray X-MP. Then mobile and/or portable terminals can access either the main frame or the super computer, or in general, any of the hosts that are connected to the network controller.

As indicated in FIG. 9, four hosts can be on one network. Referring to FIGS. 10 and 11, a multiplicity of hosts may be coupled with each local area network so as to be in communication with one or more of the disclosed network controllers. Furthermore, a single disclosed network controller can control two radio networks such as the one indicated at 50 in FIG. 3. Where each network such as 50 is limited to thirty-two devices, the number of devices is doubled with the use of two radio networks. Two such radio networks may also be utilized for the sake of redundancy, with a provision for automatic switch-over from one radio network to the second if a problem develops on the first. Two radio networks may also facilitate the use of different radio technologies in one installation.

The various multi-drop local area networks referred to herein, for example at 7-82 in FIG. 7 and as represented at 56, 56A, 56B, FIGS. 9 through 12, and at 13-82 in FIG. 13 may comprise HDLC based local area networks operating at up to 2.5 megabits per second and using biphase space encoding (FM0) for clock recovery from data.

The components 86 and 94, FIG. 4, and component 13-11, FIG. 13, provides a low-cost base radio interface using three pairs of twisted conductors. One pair provides a bidirectional RS485 data line. Another pair is used for the clock and has an RS422 electrical configuration, and is one directional from the radio to the controller. The third twisted pair is also RS422 and is used to communicate from the controller to the radio transceiver to effect mode selection.

Since it is advantageous to operate the network and router RF transceiver units so as to be compatible with existing mobile data collection terminals such as shown in APPENDIX D1 et seq., a preferred mode of operation is based on the RTC protocol as disclosed in the aforementioned incorporated Mahany and Sojka patents and the following pending applications:

(1) U.S. Ser. No. 07/389,727 filed Aug. 4, 1989.
(2) European Published Patent Application EPO 353759 published Feb. 7, 1990.
(3) U.S. Ser. No. 07/485,313 filed Feb. 26, 1990.

The disclosures of applications (1), (2) and (3) are hereby incorporated herein by reference in their entirety.

Figure 5:
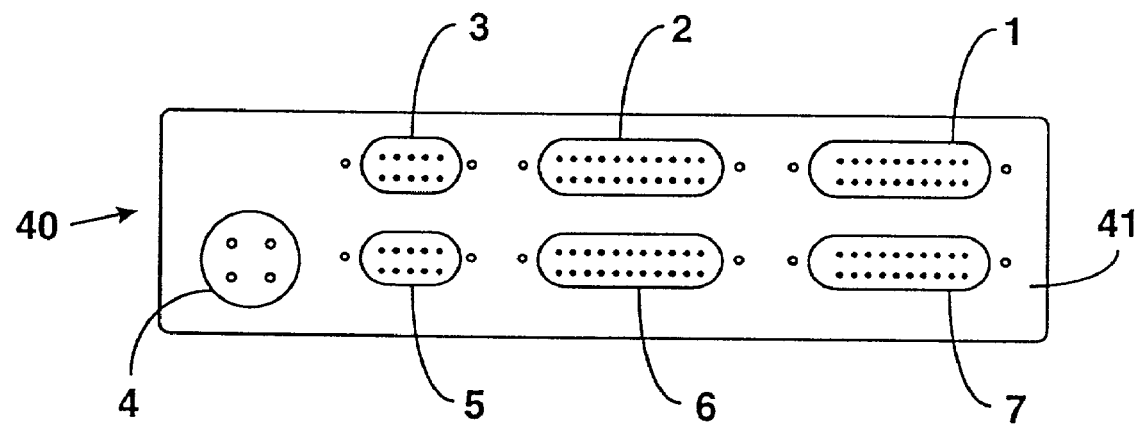
FIG. 5 is a rear elevation view of the invention.

An aspect of the invention resides in the provision of a network controller having port means selectively configurable for coupling in first mode with network RF transceiver units at a relatively high data rate such as 100 kilobits per second or higher, and for coupling in a second mode with network transceiver units at a relatively low data rate such as about twenty kilobits per second. Preferably a single port means such as 2, 3 or 5, 6, FIG. 5, can be software configured to interface selectively in the first mode or in the second mode. It is presently less expensive to use two connectors per port rather than a single 37-pin connector for example.

Where a network controller such as 40 operates two high data rate networks, for example, one network of RF base transceivers could operate with the RTC protocol, and the second network could operate according to a different protocol such as that disclosed in pending application Ser. No. 07/660,618 filed on or about Feb. 25, 1991, the disclosure of which being incorporated herein by reference in its entirety.

It will be apparent that many modifications and variations may be effected without departing from the scope of the teachings and concepts of the present disclosure.

Having described the invention, we claim:

1. In a data communication system having a plurality of mobile transceiver units communicative with a plurality of base transceiver units, one or more circuits comprising:
   a network controller intercommunicative between the base transceiver units and one or more host computers for data interchange therebetween, having at least one port, wherein each of the at least one port communicates using a selected one of a plurality of different electrical interface standards, and providing software-controllable selection of the one of the plurality of different electrical interface standards for communication using said at least one port, based upon user input.

2. The one or more circuits of claim 1 wherein said controller includes means for interconnection of existing installed mobile transceiver units therewith.

3. The one or more circuits of claim 2 wherein said controller communicates with said base transceiver units by an RS232C interface.

4. The one or more circuits of claim 1 wherein said one or more circuits provide a multiplicity of data communication ports thereon,
   at least two of said communication ports being software-controllable to select among the plurality of different electrical interface standards.

5. The one or more circuits of claim 4 wherein at least one of said communication ports being communicative with a network of serially interconnected base transceiver units over a single twisted pair.

6. The one or more circuits of claim 1 wherein at least a portion of said mobile transceiver units are communicative with said base transceiver units by spread spectrum means.

7. The one or more circuits of claim 1 wherein at least a portion of said mobile transceiver units are communicative with said base transceiver units by synthesized frequency radio means.

8. The one or more circuits of claim 5 wherein said network of base transceiver units is operable over an RS485 interface.

9. The one or more circuits of claim 1 wherein said network controller providing a multiplicity of data communication ports thereon,
   at least three of said communication ports being software-controllable to select among the plurality of different electrical interface standards,
   at least two of said at least three communication ports being selectively controllable to communicate by RS232, RS422, RS485, and V.35 means.

10. In a data communication system having a multiplicity of mobile portable transceiver units communicative by radio means with base transceiver units, an apparatus for data interchange between said base transceiver units and a host computer comprising:
- a housing having a multiplicity of communication ports thereon;
- at least three of said communication ports each selectively controllable to provide data interchange using an electrical interface standard selected from a plurality of electrical interface standards comprising an RS232 electrical interface standard and at least one non-RS232 electrical interface standard, based upon user input; and
- at least two of said communication ports each selectively controllable to provide data interchange using an electrical interface standard selected from a plurality of electrical interface standards comprising an RS422 electrical interface standard and at least one non-422 electrical interface standard, based upon user input.

11. The apparatus of claim 10 wherein,
at least one of said communication ports is selectively controllable to provide data interchange by a V.35 interface.

12. The apparatus of claim 10 wherein,
said at least two communication ports are selectively controllable to provide data interchange by a RS485 interface.

13. The apparatus of claim 10 wherein more than one host computer may be interconnected to said data communication system.

14. The apparatus of claim 10 wherein,
a number of said multiplicity of communication ports are dedicated to interconnection to host computers and the remainder of said communicative parts are interconnectable with base transceiver units.

15. A data communication system comprising:
a network controller member having a multiplicity of communication ports thereon;
said network controller member intercommunicative with a data processor at one of said communication ports;
said network controller member intercommunicative with a stationary receiver at another of said communication ports; and
said network controller member selectively operable with said data processor over the one of said communication ports, the one of said communication ports being software configurable to communicate using a user selectable one of a plurality of different electrical interface standards, based upon user input to said network controller member.

16. The system of claim 15 wherein
said network controller member is selectively operable with said stationary receiver at one or more communication rates.

17. The system of claim 15 wherein
said network controller is selectively intercommunicative with a diagnostic device over one of said communication ports.

18. The system of claim 15 further comprising:
a second data processor associated with said network controller member and intercommunicative therewith.

19. The system of claim 15 wherein
a multiplicity of stationary receivers are intercommunicative with said network controller member.

20. The system of claim 15 wherein
said network controller member is selectively operable to communicate with said data processor at more than one data transfer rate.

21. The system of claim 15, wherein the plurality of different electrical interface standards comprises an RS232 standard, an RS422 standard, an RS485 standard, and a V.35 standard.

22. One or more circuits for use in a network controller, the one or more circuits comprising:
- at least one interface enabling receipt of user input; and
- at least one processor operably coupled to the at least one interface and to a plurality of data communication ports, the at least one processor operable to, at least,
  - receive input from a user via the at least one interface, the input identifying one of a plurality of different electrical interface standards,
  - configure one of the plurality of data communication ports to operate using the user identified electrical interface standard, and
  - cause exchange of data between the one of the plurality of data communication ports and another of the plurality of data communication ports.

23. The one or more circuits of claim 22, wherein the plurality of different electrical interface standards are electrically incompatible standards.

24. The one or more circuits of claim 22, wherein the plurality of different electrical interface standards comprises an RS422 standard and an RS232 standard.

25. The one or more circuits of claim 22, wherein the plurality of different electrical interface standards comprises an RS485 standard and a V.35 standard.

26. The one or more circuits of claim 22, wherein the at least one processor is operable to communicate diagnostic information via at least one of the plurality of data communication ports.

27. The one or more circuits of claim 22, wherein each of the plurality of data communication ports comprises a plurality of electrical signals, and wherein configuration of the one of the plurality of data communication ports comprises the at least one processor causing electrical interconnection of each of the plurality of electrical signals with an associated one of a plurality of conductors of a multiconductor electrical connector, in accordance with the identified one of the plurality of different electrical interface standards.

* * * * *